United States Patent
Hasegawa

(10) Patent No.: US 8,466,252 B2
(45) Date of Patent: Jun. 18, 2013

(54) OPTICAL FILM, OPTICAL FILM MANUFACTURING METHOD, TRANSPARENT SUBSTRATE, IMAGE DISPLAY DEVICE, AND SOLAR CELL

(75) Inventor: Masatoshi Hasegawa, Chiba (JP)

(73) Assignee: Kaneka Corporation, Osaka (JP)

(*) Notice: Subject to any disclaimer, the term of this patent is extended or adjusted under 35 U.S.C. 154(b) by 0 days.

(21) Appl. No.: 13/511,906

(22) PCT Filed: Oct. 8, 2010

(86) PCT No.: PCT/JP2010/067778
§ 371 (c)(1),
(2), (4) Date: May 24, 2012

(87) PCT Pub. No.: WO2011/065131
PCT Pub. Date: Jun. 3, 2011

(65) Prior Publication Data
US 2012/0270999 A1 Oct. 25, 2012

(30) Foreign Application Priority Data

Nov. 26, 2009 (JP) .................................. 2009-268757

(51) Int. Cl.
*C08G 73/00* (2006.01)

(52) U.S. Cl.
USPC ............ 528/170; 528/30; 528/380; 536/18.1; 549/4; 549/50

(58) Field of Classification Search
USPC ................ 528/170, 30, 380; 536/18.1; 549/4, 549/50
See application file for complete search history.

(56) References Cited

U.S. PATENT DOCUMENTS

| 5,071,997 A | 12/1991 | Harris |
| 5,194,579 A | 3/1993 | Numata et al. |
| 5,344,916 A | 9/1994 | Harris et al. |
| 5,480,964 A | 1/1996 | Harris et al. |
| 5,580,950 A | 12/1996 | Harris et al. |

FOREIGN PATENT DOCUMENTS

| JP | 08-511812 A | 12/1996 |
| JP | 2001-139880 A | 5/2001 |
| JP | 2002-122991 A | 4/2002 |
| JP | 2004-211055 A | 7/2004 |
| JP | 2007-193045 A | 8/2007 |
| JP | 2008-280261 A | 11/2008 |
| JP | 2009-175358 A | 8/2009 |
| JP | 2010-043048 A | 2/2010 |
| JP | 2010-106225 A | 5/2010 |

OTHER PUBLICATIONS

Notice of Transmittal of Translation of the International Preliminary Report on Patentability (Form PCT/IB/338) of International Patent Application No. PCT/JP2010/067778, dated Jul. 19, 2012, with Forms PCT/IB/373 and PCT/ISA/237.

Sugiura, Kentaro et al., "Positive-type Photo-patterning of Low-CTE and High-Modulus Polyimides (9) Use of a Novel Fluorine-containing Tetracarboxylic Dianhydride", Abstract of the 17th Japan Polyimide and Aromatic Polymer Conference, 2009, P.1-3, 27, cited in specification, w/ English translation.

International Search Report of PCT/JP2010/067778, mailing date of Dec. 28, 2010, w/ English translation.

*Primary Examiner* — Shane Fang
(74) *Attorney, Agent, or Firm* — Westerman, Hattori, Daniels & Adrian, LLP

(57) ABSTRACT

An optical film that is excellent not only in transparency and heat resistance but also in solubility in an organic solvent and linear thermal expansion coefficient. Also, a product or a member which meets high demands for heat resistance and low linear thermal expansion coefficient with the use of the optical film, more specifically a transparent substrate using the optical film, and an image display device and a solar cell including the optical film or the transparent substrate. The optical film contains a polyimide having a specific structure in which a repeating unit of a chain of a polymer has both an amide group and an imide group and the polymer has a fluorine atom. The polyimide is obtained by mixing a dehydrating agent and an imidizing agent with a polyamic acid solution so as to imidize the polyamic acid.

16 Claims, No Drawings

OPTICAL FILM, OPTICAL FILM MANUFACTURING METHOD, TRANSPARENT SUBSTRATE, IMAGE DISPLAY DEVICE, AND SOLAR CELL

TECHNICAL FIELD

The present invention relates to an optical film that is excellent in dimensional stability and to a method for producing the optical film. The present invention preferably relates to an optical film that is excellent in heat resistance, more specifically to (i) an optical film and a transparent substrate that can be suitably used as a material (e.g., alternative film to glass in an image display device) for forming a product or a member that is required to meet high demands for solubility in an organic solvent, transparency, and dimensional stability, (ii) an image display device including the optical film or the transparent substrate, and (iii) a solar cell including the optical film or the transparent substrate.

BACKGROUND ART

In recent years, devices are required to have smaller thickness, smaller weight, and even flexibility in association with rapid progress in electronics such as display devices (e.g., liquid crystal display devices, organic EL display devices, and electronic paper), solar cells, and touch panels. In such devices, various electronic elements such as a thin film transistor and a transparent electrode are provided on a glass plate. By replacing such a glass material with a film material, a panel itself can be reduced in thickness and in weight. However, formation of these electronic elements requires a high temperature process, and there has been no film material that can endure this high temperature process.

Moreover, in a case where these fine elements made of inorganic materials are formed on a film, there have been a risk that a difference in linear thermal expansion coefficient between the inorganic materials and the film would cause the film to warp or even break the inorganic elements after formation of the inorganic elements. In view of the circumstances, there have been demands for a film material that has the same linear thermal expansion coefficient as the inorganic materials while still having transparency and heat resistance.

Polyimides have heat resistance and high insulating performance, and have therefore been applied to electronic components. Accordingly, polyimides are often laminated with monocrystalline silicon or a metal such as copper. As such, there have been attempts to reduce the linear thermal expansion coefficient of polyimides to be as small as those of monocrystalline silicon and metals.

One of factors which greatly affect the linear thermal expansion coefficient of polyimides is chemical structures thereof. Generally, it is said that a polyimide with a more rigid and linear polymer chain has a lower linear thermal expansion coefficient. In order to reduce the linear thermal expansion coefficient of a polyimide, various structures of both tetracarboxylic dianhydride and diamine each of which is an ingredient of polyimides have been proposed.

Out of the proposed polyimides, a polyimide which contains a fluorine substituent (e.g., a polyimide obtained from 2,2'-bis(trifluoromethyl)benzidine (hereinafter referred to as TFMB)) is relatively excellent not only in heat resistance and linear thermal expansion coefficient but also in solubility in an organic solvent and transparency. Such a polyimide is reported in some literatures (for example, Patent Literature 1, Patent Literature 2, and Patent Literature 3).

For example, Patent Literature 1 and Patent Literature 2 describe thermophysical properties of a polyimide using TFMB. However, details of the other physical properties are not described in Patent Literature 1 and Patent Literature 2.

Patent Literature 3 discloses a technique regarding a soluble polyimide using TFMB. Although Patent Literature 3 mentions about a linear thermal expansion coefficient, Patent Literature 3 describes only solubility in N-methyl-2-pyrrolidone (NMP) and does not describe anything about solubility in other solvents.

As described above, although polyimides containing a fluorine atom, especially polyimides obtained from TFMB have been conventionally known, a polyimide which has solubility in various kinds of organic solvent and a low linear thermal expansion coefficient has never been disclosed.

CITATION LIST

Patent Literature 1
U.S. Pat. No. 5,071,997 (Publication Date: Dec. 10, 1991)
Patent Literature 2
U.S. Pat. No. 5,194,579 (Publication Date: Mar. 16, 1993)
Patent Literature 3
Japanese Patent Application Publication, Tokuhyohei, No. 8-511812 (Publication Date: Dec. 10, 1996)
Non-Patent Literature 1
Kentaro Sugiura, Jun Nakano, Masatoshi Hasegawa, Positive-type Photo-patterning of Low-CTE and High-Modulus Polyimides (9), Proceedings of 17th Japan Polyimide & Aromatic Polymers Conference, 2009. 10.16, p. 27

SUMMARY OF INVENTION

Technical Problem

The present invention was attained in view of the above circumstances and an object of the present invention is to provide an optical film that is excellent not only in transparency and heat resistance but also in solubility in an organic solvent and has a low thermal expansion coefficient. Another object of the present invention is to provide a product or a member which meets high demands for heat resistance and low linear thermal expansion coefficient with the use of the optical film, more specifically a product or a member in which the optical film of the present invention is provided on a surface of an inorganic material such as glass, metal, a metal oxide, or monocrystalline silicon.

Solution to Problem

The inventors of the present invention found that an effective way for achieving the above object, i.e., an effective way for obtaining an optical film that is excellent not only in transparency and heat resistance but also in solubility in organic solvents and has a low thermal expansion coefficient is to configure the optical film such that a repeating unit of a chain of a polymer of the optical film has both an amide group and an imide group therein and the polymer of the optical film contains a fluorine atom. Moreover, the inventors of the present invention found that a film producing method including forming a film in a state of polyamic acid and subsequently imidizing the film thermally or chemically cannot provide a polyimide film with sufficient linear thermal expansion coefficient and dimensional stability, and therefore is not suitable for the object of the present invention.

The present invention has the following arrangement.
The optical film of the present invention contains a polyimide having a repeating unit represented by the following formula (1):

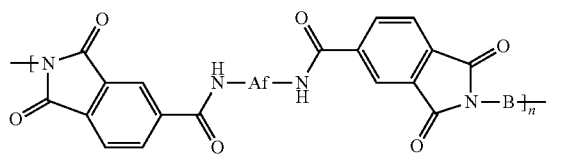

where Af represents a bivalent organic group having an aromatic ring and a fluorine atom, and B represents a bivalent organic group, the optical film having a linear thermal expansion coefficient of 20 ppm/K or less.

Advantageous Effects of Invention

The optical film of the present invention has a low linear thermal expansion coefficient equivalent to those of various inorganic materials in addition to transparency and heat resistance. Accordingly, the optical film of the present invention is suitable as a film or a coating film of all publicly-known members which require heat resistance and low expansion rate (dimensional stability). Moreover, the polyimide of the present invention is soluble in various organic solvents, and therefore can be easily applied to various substrates. The optical film of the present invention is expected to be used, for example, as a printed material, a color filter, a flexible display, an antireflection film, a hologram, an optical member, a building material, or a construction.

DESCRIPTION OF EMBODIMENTS

The present invention is described below in detail.

An optical film produced according to the present invention is an optical film having a repeating unit represented by the following formula (1):

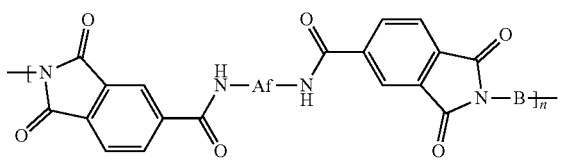

The repeating unit in the formula (1) is characterized by having not only an imide group as polyimide, but also an amide group. Af in the formula (1) represents a bivalent organic group having an aromatic ring and a fluorine atom. The bivalent substituent containing an aromatic ring and a fluorine atom has, for example, the following structure, but is not limited to this.

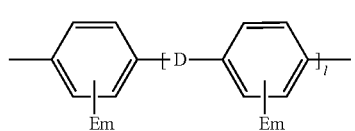

In the formula (2), D represents a functional group selected from a single bond, a $CR_2$ group, a CO group, a $SO_2$ group, a $SiR_2$ group, an oxygen atom, and a sulfur atom, where R is identically or differently a hydrogen atom, a fluorine atom, an alkyl group having 1 to 20 carbon atoms, or an aryl group having 6 to 20 carbon atoms, the two Rs may form a ring with each other, and a hydrogen atom in the alkyl group and the aryl group may be substituted with a fluorine atom. In the formula (2), E is a fluorine atom or an organic group which has a fluorine atom, m is an integer of 0 to 4, and l is an integer of 0 to 4. The fluorine atom may be contained in D or may be contained in E in the formula (2), but is preferably contained in E in order that a rigid polymer structure may be obtained. That is, it is more preferable that m is an integer of 1 to 4. From the viewpoint of availability, E is more preferably a fluorine atom or a trifluoromethyl group.

Since the formula (2) has an amide bond at both ends of the structure, a diamine is generally used as a starting material for Af. Examples of a diamine to be used include, but are not limited to, 1,4-diamino-2-fluorobenzene, 1,4-diamino-2,3-difluorobenzene, 1,4-diamino-2,5-difluorobenzene, 1,4-diamino-2,6-difluorobenzene, 1,4-diamino-2,3,5-trifluorobenzene, 1,4-diamino-2,3,5,6-tetrafluorobenzene 1,4-diamino-2-(trifluoromethyl)benzene, 1,4-diamino-2,3-bis(trifluoromethyl)benzene, 1,4-diamino-2,5-bis(trifluoromethyl)benzene, 1,4-diamino-2,6-bis(trifluoromethyl)benzene, 1,4-diamino-2,3,5-tris(trifluoromethyl)benzene, 1,4-diamino-2,3,5,6-tetrakis(trifluoromethyl)benzene, 2-fluorobenzidine, 3-fluorobenzidine, 2,3-difluorobenzidine, 2,5-difluorobenzidine, 2,6-difluorobenzidine, 2,3,5-trifluorobenzidine, 2,3,6-trifluorobenzidine, 2,3,5,6-tetrafluorobenzidine, 2,2'-difluorobenzidine, 3,3'-difluorobenzidine, 2,3'-difluorobenzidine, 2,2',3-trifluorobenzidine, 2,3,3'-trifluorobenzidine, 2,2',5-trifluorobenzidine, 2,2',6-trifluorobenzidine, 2,3',5-trifluorobenzidine, 2,3',6-trifluorobenzidine, 2,2',3,3'-tetrafluorobenzidine, 2,2',5,5'-tetrafluorobenzidine, 2,2',6,6'-tetrafluorobenzidine, 2,2',3,3',6,6'-hexafluorobenzidine, 2,2',3,3',5,5',6,6'-octafluorobenzidine, 2-(trifluoromethyl)benzidine, 3-(trifluoromethyl)benzidine, 2,3-bis(trifluoromethyl)benzidine, 2,5-bis(trifluoromethyl)benzidine, 2,6-bis(trifluoromethyl)benzidine, 2,3,5-tris(trifluoromethyl)benzidine, 2,3,6-tris(trifluoromethyl)benzidine, 2,3,5,6-tetrakis(trifluoromethyl)benzidine, 2,2'-bis(trifluoromethyl)benzidine, 3,3'-bis(trifluoromethyl)benzidine, 2,3'-bis(trifluoromethyl)benzidine, 2,2',3-tris(trifluoromethyl)benzidine 2,3,3'-tris(trifluoromethyl)benzidine, 2,2',5-tris(trifluoromethyl)benzidine, 2,2',6-tris(trifluoromethyl)benzidine, 2,3',5-tris(trifluoromethyl)benzidine, 2,3',6-tris(trifluoromethyl)benzidine, 2,2',3,3'-tetrakis(trifluoromethyl)benzidine, 2,2',5,5'-tetrakis(trifluoromethyl)benzidine, and 2,2',6,6'-tetrakis(trifluoromethyl)benzidine.

Out of the structures exemplified in the formula (2), a structure selected from the following formulas (3) and (4) is especially preferably used, from the viewpoint of rigidity of a resultant polymer and availability of ingredients.

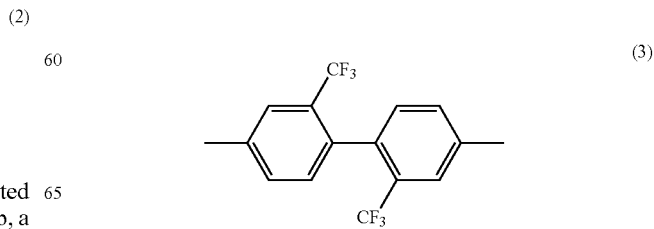

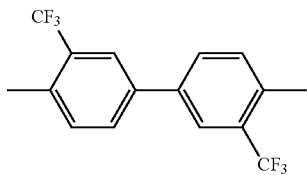

(4)

Next, the following describes B in the formula (1) of the present invention.

B in the formula (1) may have any structure. Specific examples of a diamine monomer that can be used for B in the formula (1) include p-phenylenediamine, m-phenylenediamine, o-phenylenediamine, 3,3'-diaminodiphenyl ether, 3,4'-diaminodiphenyl ether, 4,4'-diaminodiphenyl ether, 3,3'-diaminodiphenyl sulfide, 3,4'-diaminodiphenyl sulfide, 4,4'-diaminodiphenyl sulfide, 3,3'-diaminodiphenyl sulfone, 3,4'-diaminodiphenyl sulfone, 4,4'-diaminodiphenyl sulfone, 3,3'-diaminobenzophenone, 4,4'-diaminobenzophenone, 3,4'-diaminobenzophenone, 3,3'-diaminodiphenylmethane, 4,4'-diaminodiphenylmethane, 3,4'-diaminodiphenylmethane, 2,2-bis(3-aminophenyl)propane, 2,2-bis(4-aminophenyl)propane 2-(3-aminophenyl)-2-(4-aminophenyl)propane, 1,1-bis(3-aminophenyl)-1-phenylethane, 1,1-bis(4-aminophenyl)-1-phenylethane 1-(3-aminophenyl)-1-(4-aminophenyl)-1-phenylethane, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 1,3-bis(3-aminobenzoyl)benzene, 1,3-bis(4-aminobenzoyl)benzene, 1,4-bis(3-aminobenzoyl)benzene, 1,4-bis(4-aminobenzoyl)benzene, 1,3-bis(3-amino-α,α-dimethylbenzyl)benzene, 1,3-bis(4-amino-α,α-dimethylbenzyl)benzene, 1,4-bis(3-amino-α,α-dimethylbenzyl)benzene, 1,4-bis(4-amino-α,α-dimethylbenzyl)benzene, 2,6-bis(3-aminophenoxy)benzonitrile, 2,6-bis(3-aminophenoxy)pyridine, 4,4'-bis(3-aminophenoxy)biphenyl, 4,4'-bis(4-aminophenoxy)biphenyl, bis[4-(3-aminophenoxy)phenyl]ketone, bis[4-(4-aminophenoxy)phenyl]ketone, bis[4-(3-aminophenoxy)phenyl]sulfide, bis[4-(4-aminophenoxy)phenyl]sulfide, bis[4-(3-aminophenoxy)phenyl]sulfone, bis[4-(4-aminophenoxy)phenyl]sulfone, bis[4-(3-aminophenoxy)phenyl]ether, bis[4-(4-aminophenoxy)phenyl]ether, 2,2-bis[4-(3-aminophenoxy)phenyl]propane, 2,2-bis[4-(4-aminophenoxy)phenyl]propane, 1,3-bis[4-(3-aminophenoxy)benzoyl]benzene, 1,3-bis[4-(4-aminophenoxy)benzoyl]benzene, 1,4-bis[4-(3-aminophenoxy)benzoyl]benzene, 1,4-bis[4-(4-aminophenoxy)benzoyl]benzene, 1,3-bis[4-(3-aminophenoxy)-α,α-dimethylbenzyl]benzene, 1,3-bis[4-(4-aminophenoxy)-α,α-dimethylbenzyl]benzene, 1,4-bis[4-(3-aminophenoxy)-α,α-dimethylbenzyl]benzene, 1,4-bis[4-(4-aminophenoxy)-α,α-dimethylbenzyl]benzene, 4,4'-bis[4-(4-aminophenoxy)benzoyl]diphenyl ether, 4,4'-bis[4-(4-amino-α,α-dimethylbenzyl)phenoxy]benzophenone, 4,4'-bis[4-(4-amino-α,α-dimethylbenzyl)phenoxy]diphenyl sulfone, 4,4'-bis[4-(4-aminophenoxy)phenoxy]diphenyl sulfone, 3,3'-diamino-4,4'-diphenoxybenzophenone, 3,3'-diamino-4,4'-dibiphenoxybenzophenone, 3,3'-diamino-4-phenoxybenzophenone, 3,3'-diamino-4-biphenoxybenzophenone, 6,6'-bis(3-aminophenoxy)-3,3,3',3'-tetramethyl-1,1'-spirobiindan, 6,6'-bis(4-aminophenoxy)-3,3,3',3'-tetramethyl-1,1'-spirobiindan, 1,3-bis(3-aminopropyl)tetramethyldisiloxane, 1,3-bis(4-aminobutyl)tetramethyldisiloxane, α,ω-bis(3-aminopropyl)polydimethylsiloxane, α,ω-bis(3-aminobutyl)polydimethylsiloxane, bis(aminomethyl)ether, bis(2-aminoethyl)ether, bis(3-aminopropyl)ether, bis(2-aminomethoxy)ethyl]ether, bis[2-(2-aminoethoxy)ethyl]ether, bis[2-(3-aminopropoxy)ethyl]ether 1,2-bis(aminomethoxy)ethane, 1,2-bis(2-aminoethoxy)ethane, 1,2-bis[2-(aminomethoxy)ethoxy]ethane, 1,2-bis[2-(2-aminoethoxy)ethoxy]ethane, ethyleneglycol bis(3-aminopropyl)ether, diethyleneglycol bis(3-aminopropyl)ether, triethyleneglycol bis(3-aminopropyl)ether, ethylenediamine, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, diaminoundecane, 1,12-diaminododecane, 1,2-diaminocyclohexane, 1,3-diaminocyclohexane, 1,4-diaminocyclohexane, trans-1,4-diaminocyclohexane, 1,2-di(2-aminoethyl)cyclohexane, 1,3-di(2-aminoethyl)cyclohexane, 1,4-di(2-aminoethyl)cyclohexane, bis(4-aminocyclohexyl)methane, 2,6-bis(aminomethyl)bicyclo[2.2.1]heptane, 2,5-bis(aminomethyl)bicyclo[2.2.1]heptane, 1,4-diamino-2-fluorobenzene, 1,4-diamino-2,3-difluorobenzene, 1,4-diamino-2,5-difluorobenzene, 1,4-diamino-2,6-difluorobenzene, 1,4-diamino-2,3,5-trifluorobenzene, 1,4-diamino-2,3,5,6-tetrafluorobenzene 1,4-diamino-2-(trifluoromethyl)benzene, 1,4-diamino-2,3-bis(trifluoromethyl)benzene, 1,4-diamino-2,5-bis(trifluoromethyl)benzene, 1,4-diamino-2,6-bis(trifluoromethyl)benzene, 1,4-diamino-2,3,5-tris(trifluoromethyl)benzene, 1,4-diamino-2,3,5,6-tetrakis(trifluoromethyl)benzene 2-fluorobenzidine, 3-fluorobenzidine, 2,3-difluorobenzidine, 2,5-difluorobenzidine, 2,6-difluorobenzidine, 2,3,5-trifluorobenzidine, 2,3,6-trifluorobenzidine, 2,3,5,6-tetrafluorobenzidine, 2,2'-difluorobenzidine, 3,3'-difluorobenzidine, 2,3'-difluorobenzidine, 2,2',3-trifluorobenzidine, 2,3,3'-trifluorobenzidine, 2,2',5-trifluorobenzidine, 2,2',6-trifluorobenzidine, 2,3',5-trifluorobenzidine, 2,3',6-trifluorobenzidine, 2,2',3,3'-tetrafluorobenzidine, 2,2',5,5'-tetrafluorobenzidine, 2,2',6,6'-tetrafluorobenzidine, 2,2',3,3',6,6'-hexafluorobenzidine, 2,2',3,3',5,5',6,6'-octafluorobenzidine, 2-(trifluoromethyl)benzidine, 3-(trifluoromethyl)benzidine, 2,3-bis(trifluoromethyl)benzidine, 2,5-bis(trifluoromethyl)benzidine, 2,6-bis(trifluoromethyl)benzidine, 2,3,5-tris(trifluoromethyl)benzidine, 2,3,6-tris(trifluoromethyl)benzidine, 2,3,5,6-tetrakis(trifluoromethyl)benzidine, 2,2'-bis(trifluoromethyl)benzidine, 3,3'-bis(trifluoromethyl)benzidine, 2,3'-bis(trifluoromethyl)benzidine, 2,2',3-tris(trifluoromethyl)benzidine 2,3,3'-tris(trifluoromethyl)benzidine, 2,2',5-tris(trifluoromethyl)benzidine, 2,2',6-tris(trifluoromethyl)benzidine, 2,3',5-tris(trifluoromethyl)benzidine, 2,3',6-tris(trifluoromethyl)benzidine, 2,2',3,3'-tetrakis(trifluoromethyl)benzidine, 2,2',5,5'-tetrakis(trifluoromethyl)benzidine, and 2,2',6,6'-tetrakis(trifluoromethyl)benzidine.

It is preferable that B in the formula (1) have a bivalent organic group which contains an aromatic ring and a fluorine atom, especially in terms of solubility in organic solvents, i.e., from the viewpoint of solubility in organic solvents. More specifically, it is preferable that B in the formula (1) has the structure represented by the following formula (2).

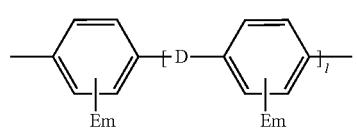

(2)

In the formula (2), D represents a functional group selected from a single bond, a $CR_2$ group, a CO group, a $SO_2$ group, a $SiR_2$ group, an oxygen atom, and a sulfur atom, where R is identically or differently a hydrogen atom, a fluorine atom, an alkyl group having 1 to 20 carbon atoms, or an aryl group having 6 to 20 carbon atoms, the two Rs may form a ring with each other, and a hydrogen atom in the alkyl group and the aryl group may be substituted with a fluorine atom. In the formula (2), E is a fluorine atom or an organic group which has a fluorine atom, m is an integer of 0 to 4, and 1 is an integer of 0 to 4. The fluorine atom may be contained in D or may be contained in E in the formula (2), but is preferably contained in E in order that a rigid polymer structure is obtained. That is, it is more preferable that m is an integer of 1 to 4. From the viewpoint of availability, E is more preferably a fluorine atom or a trifluoromethyl group.

More preferably, diamines presented as specific examples of Af can be used for B. Out of the structures exemplified in the formula (2), a structure selected from the following formulas (3) and (4) is especially preferably used, from the viewpoint of rigidity of a resultant polymer and availability of ingredients.

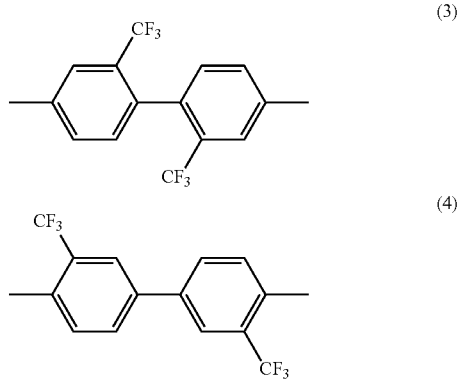

Other tetracarboxylic dianhydrides and diamines can be used depending on physical properties to be sought. A ratio of the repeating unit represented by the formula (1) in the polyimide of the present invention is 30 mol % or more, preferably 50 mol % or more, more preferably 70 mol % or more with respect to the whole polymer although such a ratio is selected in view of balance between solubility and a low linear thermal expansion coefficient. The repeating unit represented by the formula (1) may be regularly arranged or may be randomly present in the polyimide.

Examples of other tetracarboxylic dianhydrides that can be used together with the tetracarboxylic dianhydride in the repeating unit represented by the formula (1) include, but are not limited to, ethylenetetracarboxylic dianhydride, butanetetracarboxylic dianhydride, cyclobutanetetracarboxylic dianhydride, cyclopentanetetracarboxylic dianhydride, 3,3',4,4'-benzophenonetetracarboxylic dianhydride, 2,2',3,3'-benzophenonetetracarboxylic dianhydride, 3,3',4,4'-biphenyltetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(3,4-dicarboxyphenyl)sulfone dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, 1,3-bis[(3,4-dicarboxy)benzoyl]benzene dianhydride, 1,4-bis[(3,4-dicarboxy)benzoyl]benzene dianhydride, 2,2-bis{4-[4-(1,2-dicarboxy)phenoxy]phenyl}propane dianhydride, 2,2-bis{4-[3-(1,2-dicarboxy)phenoxy]phenyl}propane dianhydride, bis{4-[4-(1,2-dicarboxy)phenoxy]phenyl}ketone dianhydride, bis{4-[3-(1,2-dicarboxy)phenoxy]phenyl}ketone dianhydride, 4,4'-bis[4-(1,2-dicarboxy)phenoxy]biphenyl dianhydride, 4,4'-bis[3-(1,2-dicarboxy)phenoxy]biphenyl dianhydride, bis{4-[4-(1,2-dicarboxy)phenoxy]phenyl}ketone dianhydride, bis{4-[3-(1,2-dicarboxy)phenoxy]phenyl}ketone dianhydride, bis{4-[4-(1,2-dicarboxy)phenoxy]phenyl}sulfone dianhydride, bis{4-[3-(1,2-dicarboxy)phenoxy]phenyl}sulfone dianhydride, bis{4-[4-(1,2-dicarboxy)phenoxy]phenyl}sulfide dianhydride, bis{4-[3-(1,2-dicarboxy)phenoxy]phenyl}sulfide dianhydride, 2,2-bis{4-[4-(1,2-dicarboxy)phenoxy]phenyl}-1,1,1,3,3,3-hexafluoropropane dianhydride, 2,2-bis{4-[3-(1,2-dicarboxy)phenoxy]phenyl}-1,1,1,3,3,3-hexafluoropropane dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, and 1,2,7,8-phenanthrenetetracarboxylic dianhydride. These are used alone or in combination of two or more.

Examples of other diamines that can be used together with the diamine in the repeating unit represented by the formula (1) are diamines equivalent to those presented as examples of B in the formula (1).

The optical film of the present invention may be produced by a conventionally known method. For example, the following method can be employed. A polyamic acid, which is a precursor of a polyimide, is synthesized from a tetracarboxylic dianhydride and a diamine. To the polyamic acid thus synthesized, a dehydrating agent and an imidizing agent are added so as to produce polyamic acid varnish. After the polyamic acid varnish thus produced by adding the dehydrating agent and the imidizing agent to the polyamic acid is fully imidized in a reaction solvent, a poor solvent is added to the reaction solvent, thereby obtaining a polyimide resin solid. The film formation method including isolating the polyimide resin in the form of the polyimide resin solid is especially preferable since (i) the dehydrating agent and the imidizing agent, which become impurities, can be washed away with the poor solvent and (ii) an organic solvent suitable for a substrate to be coated can be selected from various kinds of organic solvent. A film formation method including forming a film in a state of a polyamic acid and then imidizing the film thermally or chemically is not suitable for the object of the present invention since the obtained film is poor in linear thermal expansion coefficient and dimensional stability.

In this case, the imidizing agent can be a tertiary amine, more preferably a heterocyclic tertiary amine. Preferable specific examples of the heterocyclic tertiary amine encompass pyridine, picoline, quinoline, and isoquinoline. Preferable specific examples of the dehydrating agent encompass acetic anhydride, propionic anhydride, n-butyric anhydride, benzoic anhydride, and trifluoroacetic anhydride.

The imidizing agent is preferably added in an amount of 0.5 to 5.0 molar equivalent, more preferably 0.7 to 2.5 molar equivalent, especially preferably 0.8 to 2.0 molar equivalent with respect to the amide group of the polyamic acid. The dehydrating agent is preferably added in an amount of 0.5 to 10.0 molar equivalent, more preferably 0.7 to 5.0 molar equivalent, especially preferably 0.8 to 3.0 molar equivalent with respect to the amide group of the polyamic acid.

The imidizing agent and the dehydrating agent may be directly added to the polyamic acid solution without dissolving them in a solvent or may be added to the polyamic acid solution by adding a solvent in which the imidizing agent and the dehydrating agent are dissolved. In the case of directly adding the imidizing agent and the dehydrating agent to the polyamic acid solution, gel formation would take place because the reaction may rapidly progress before the imidizing agent and the dehydrating agent are diffused. As such, it is preferable that the imidizing agent and the dehydrating agent dissolved in a solvent be mixed with the polyamic acid solution.

The following more specifically describes a method for synthesizing the polyimide of the present invention. It should be noted that the present invention is not limited to this.

A polyamic acid can be obtained by mixing a diamine component and a tetracarboxylic dianhydride component. The mixing the diamine component and tetracarboxylic dianhydride component is preferably carried out under stirring performed for 1 to 20 hours. An optimum reaction temperature during the stirring is appropriately selected according to which type of a tetracarboxylic dianhydride or a diamine is to be used. Specifically, the optimum reaction temperature during the stirring is preferably in a range from 0° C. to 140° C., more preferably in a range from 50° C. to 120° C. The diamine component and the tetracarboxylic dianhydride component are preferably used in a substantially equimolar amount. The diamine component and the tetracarboxylic dianhydride component may be mixed by adding the tetracarboxylic dianhydride component to the diamine component or vice versa, but it is preferable that the tetracarboxylic dianhydride component be added to the diamine component. The diamine component or the tetracarboxylic dianhydride component may be added at once or in portions.

Examples of the organic solvent used for polymerization of the polyamic acid include urea type solvents such as tetramethylurea and N,N-dimethylethylurea; sulfoxide or sulfone type solvents such as dimethyl sulfoxide, diphenylsulfone, and tetramethylsulfone; amide type solvents such as N,N-dimethylacetamide (DMAc), N,N-dimethylformamide (DMF), N,N'-diethylacetamide, N-methyl-2-pyrrolidone (NMP), γ-butyrolactone, and hexamethylphosphoric triamide; alkyl halide type solvents such as chloroform and methylene chloride; aromatic hydrocarbon type solvents such as benzene and toluene; phenol type solvents such as phenol and cresol; and ether type solvents such as tetrahydrofuran, 1,3-dioxolane, 1,4-dioxane, dimethyl ether, diethyl ether, and p-cresol methyl ether. Although these solvents are normally used alone, an appropriate combination of two or more kinds of these solvents may be used according to need. The amide type solvent such as DMF, DMAc or NMP is preferably used in order to increase solubility and reactivity of the polyamic acid.

The above described a case where a dehydrating agent and an imidizing agent are added to a polyamic acid, and after the polyamic acid is fully imidized in a reaction solvent, a poor solvent is introduced into the reaction solvent so as to obtain a polyimide resin solid. In this case, the solid-form polyimide resin may be isolated or precipitated by introducing a polyimide resin solution which contains a polyimide, an imidizing agent, and a dehydrating agent into a poor solvent. The polyimide resin solid is a material of a solid-form including a powder form, a flake form, and other various forms. The polyimide resin solid has an average particle diameter of preferably 5 mm or smaller, more preferably 3 mm or smaller, especially preferably 1 mm or smaller.

The poor solvent for the polyimide resin used in the present invention can be a poor solvent for the polyimide resin which is miscible with the organic solvent used as a solvent for dissolving the polyimide resin. Examples of the poor solvent include water, methyl alcohol, ethyl alcohol, isopropyl alcohol (2-propyl alcohol), ethylene glycol, triethylene glycol, 2-butyl alcohol, 2-hexyl alcohol, cyclopentyl alcohol, cyclohexyl alcohol, phenol, and t-butyl alcohol. Out of these alcohols, the alcohols such as isopropyl alcohol, 2-butyl alcohol, 2-pentyl alcohol, phenol, cyclopentyl alcohol, cyclohexyl alcohol, and t-butyl alcohol are preferably used, from the viewpoint of high stability of isolated polyimide resin and high imidization ratio. The isopropyl alcohol is more preferably used.

Before the polyimide resin solution is introduced into a poor solvent, the polyimide resin solution is preferably diluted so that concentration of the solid content in the polyimide resin solution becomes 15% or lower, preferably 10% or lower. In order to completely remove the solvent in a drying step, it is preferable that the polyimide resin solid produced by the introduction of the polyimide resin solution into the poor solvent has a diameter of preferably 1 mm or smaller, more preferably 0.5 mm. The poor solvent is preferably used in a volume at least three times the volume of the polyimide resin solution.

For example, immediately after the polyimide resin solution is introduced into the poor solvent, the resin may take a threadlike shape. In order to obtain the polyimide resin solid in as fine flakes as possible, the polyimide resin solution is preferably stirred in the poor solvent. An increase in amount of the solvent for dissolving the polyimide in the poor solvent after complete introduction of the polyimide resin solution allows the polyimide resin to dissolve. Accordingly, after the polyimide resin solution is introduced, a poor solvent is added preferably in the same amount as the initially-added poor solvent, more preferably in an amount two times the amount of the initially-added poor solvent. That is, after the polyimide resin solution is completely introduced, a poor solvent is added preferably in the same amount as the initially-added poor solvent, more preferably in an amount two times the amount of the initially-added poor solvent. Addition of the large amount of a poor solvent allows polyimide resin dissolved in the poor solvent to precipitate again and form a powdery polyimide resin solid.

Since the polyimide resin solid thus obtained contains a small amount of imidizing agent and dehydrating agent, the polyimide resin solid is preferably washed with the poor solvent, especially with an alcohols solvent such as isopropyl alcohol.

A method for drying the polyimide resin solid thus obtained may be vacuum drying or hot-air drying. Coloring of the polyimide resin solid would occur in a case where a drying temperature exceeds 120° C. in the presence of oxygen, and the coloring is more likely to occur at a drying temperature of 150° C. Accordingly, the polyimide resin solid is preferably dried at 120° C. or lower. Even in a vacuo or inert gas atmosphere, the polyimide resin solid is preferably dried at 120° C. or lower.

The method of once isolating the polyimide resin solid is especially preferable since (i) the dehydrating agent and the imidizing agent, which become impurities, can be washed away with the poor solvent as described above and (ii) an organic solvent suitable for a substrate to be coated can be selected from various kinds of organic solvents. The organic solvent to be used is not limited in particular, but is preferably at least one selected from amide type solvents such as dimethylformamide (DMF), dimethylacetamide (DMAC), and N-methylpyrrolidone (NMP); ketone type solvents such as acetone, methyl ethyl ketone (MEK), methyl isobutyl ketone (MIBK), cyclopentanone, and cyclohexanone; and ether type solvents such as tetrahydrofuran (THF), 1,3-dioxolane, and 1,4-dioxane. It is preferable that the polyimide resin solid dissolve in all of the amide type solvents, the ketone type solvents, and the ether type solvents, since a solvent suitable for a substrate to be coated can be selected from wide variety of solvents.

The viscosity of the polyimide resin solution is appropriately selected in accordance with the thickness of coating and a coating environment, but is preferably in a range from 0.1 Pa·s to 50 Pa·s, more preferably in a range from 0.5 Pa·s to 30 Pa·s. In a case where the viscosity of the polyimide resin solution is lower than 0.1 Pa·s, the viscosity is too low and therefore sufficient film thickness accuracy cannot be secured. Meanwhile, in a case where the viscosity of the polyimide resin solution is higher than 50 Pa·s, the viscosity is too high and therefore the film thickness accuracy cannot be secured. In addition, some parts of the coating dry immediately after the polyimide resin solution is applied. This generates appearance defects such as gel defects.

The weight-average molecular weight of the polyimide of the present invention falls preferably in a range from 5000 to 500000, more preferably in a range from 10000 to 300000, further more preferably in a range from 30000 to 200000 although the weight-average molecular weight varies depending on application of the polyimide of the present invention. In a case where the weight-average molecular weight of the polyimide is 5000 or less, coating or a film produced from such polyimide is unlikely to have sufficient strength. Meanwhile, in a case where the weight-average molecular weight of the polyimide exceeds 500000, the viscosity increases, and the solubility declines accordingly. Consequently, coating or a film produced from such polyimide is unlikely to have a smooth surface and a uniform film thickness. The molecular weight used herein is a molecular weight in terms of polyethylene glycol determined by gel permeation chromatography (GPC).

The substrate to be coated with the polyimide resin solution can be, but is not limited to, a glass substrate, a metal substrate or a metal belt made of a metal such as SUS, a plastic film made of plastic such as polyethylene terephthalate, polycarbonate, polyacrylate, polyethylene naphthalate, and triacetylcellulose, or the like. In a case where the substrate is a plastic film, an organic solvent which does not dissolve the plastic film is appropriately selected as the organic solvent of the polyimide resin solution.

The optical film of the present invention thus produced is characterized by having a low heat expansion property and dimensional stability against heating. For example, an optical film having a linear thermal expansion coefficient of 20 ppm/K or lower, preferably 15 ppm/K or lower, more preferably 10 ppm/K or lower in a temperature range from 100° C. to 200° C. can be obtained, where the linear thermal expansion coefficient is measured by thermo-mechanical analysis (TMA) under the conditions that a size of a film sample is 10 mm×3 mm, an applied load is 3.0 g, and a rate of temperature rise is 10° C./min.

From the viewpoint of heat resistance, a higher glass transition temperature is preferable. The glass transition temperature is preferably 250° C. or higher, and, from the viewpoint of higher allowable heat treatment temperature, the glass transition temperature is 300° C. or higher, where the glass transition temperature is measured by differential scanning calorimetry (DSC) or dynamic mechanical spectrometry (DMS) under the condition that a rate of temperature rise is 10° C./min.

The transparency of the optical film is, for example, expressed by total light transmittance according to JIS K7105-1981 or haze according to JIS K7105-1981. The total light transmittance is preferably 85% or more, more preferably 87% or more. The haze is preferably 2.0% or less, more preferably 1.0% or less. The optical film is required to have high transmittance in the whole wavelength range. Especially a polyimide tends to absorb light in a short wavelength side. Accordingly, a film itself produced from a polyimide is often colored in yellow. A film to be used as an optical film preferably has transmittance of 10% or more, more preferably 20% or more at a wavelength of 400 nm. The transmittance at a wavelength of 400 nm is measured by an ultra-violet and visible spectrophotometer. A film given such transparency can be used as an optical film. The optical film of the present invention is, for example, used as a light diffusing film, a brightness enhancement film, an antireflection film, a polarizer protection film, or an alternative transparent substrate to glass. The optical film of the present invention is excellent especially in heat resistance and linear thermal expansion coefficient, and therefore can be used as a transparent substrate such as an alternative film to glass.

The polyimide of the present invention may be used as it is for coating or formation process for producing a product or a member. Alternatively, the polyimide of the present invention may be used as a laminated product by subjecting a product formed in a film-shape to treatment such as coating. The polyimide of the present invention may be dissolved or dispersed in a solvent as needed and mixed with (i) light or a thermosetting component, (ii) non-polymerizable binder resin other than the polyimide of the present invention, and (iii) other components, so as to prepare a polyimide resin composition to be used for coating or formation process.

In order to give a processing property and a functionality of various kinds to the resin composition of the present invention, another organic or inorganic low-molecular or high-molecular compound of various kinds may be added. For example, dye, surfactant, leveling agent, plasticizer, fine particles, sensitizer, or the like can be used. The fine particles may be organic fine particles such as polystyrene and polytetrafluoroethylene and inorganic fine particles such as colloidal silica, carbon, and layer silicate. These fine particles may be porous and may be hollowed. Examples of functions or forms of the fine particles encompass pigment, filler, and fiber, and the like.

The polyimide resin composition of the present invention generally contains the polyimide represented by the formula (1) in a range from 5% to 99.9% by weight to the whole solid content of the resin composition. Note that what is meant by "99.9% by weight" is "substantially all". The polyimide resin composition of the present invention preferably contains other optional components in a range from 0.1% to 95% by weight to the whole solid content of the polyimide resin composition. In a case where the polyimide resin composition of the present invention contains less than 0.1% additives by weight, an effect of adding the additives is unlikely to be obtained. Meanwhile, in a case where the polyimide resin composition of the present invention contains more than 95% additives by weight, the characteristics of the resin composition are unlikely to be reflected in a final product. Note that the term "solid content of the polyimide resin composition" refers to all components other than the solvent. The "solid content" also encompasses a liquid monomer component.

On a surface of the optical film of the present invention, various inorganic thin films such as metal oxide and transparent electrode may be formed. A method for forming such inorganic thin films is not limited in particular, and can be, for example, a CVD method or a PVD method such as a sputtering method, a vacuum deposition method, or an ion plating method.

The optical film of the present invention has not only the original properties of a polyimide such as heat resistance and insulating property, but also high dimensional stability and high solubility in organic solvents. Accordingly, the optical film of the present invention is preferably used in fields/products for which these properties are effective, such as printed materials, color filters, flexible displays, image display devices such as liquid crystal display devices, organic EL display devices, and electronic paper, or solar cells, and is more preferably used as an alternative material of parts for which glass is currently used.

EXAMPLES (Evaluation Method)

The property values etc. of the materials mentioned in the present specification were obtained by the following evaluation method.

(1) Molecular Weight of Polyimide Resin

The weight-average molecular weight (Mw) was obtained under the conditions shown in Table 1. The result of the evaluation is shown in Table 2.

TABLE 1

| Items | Molecular weight measuring device conditions |
|---|---|
| Device | CO-8020, SD-8022, DP-8020, AS-8020, RI-8020 (each of which is manufactured by Tosoh Corporation) |
| Column | Shodex: GPC KD-806M×2 |
| Column size | Each: 8 mmΦ × 30 cm, total: 60 cm |
|  | Guard column (GPC KD-G) 4.6 mmΦ × 1 cm |
| Column temperature | 40° C. |
| Carrier | 30 mM-LiBr + 30 mM-phosphoric acid/THF |
| Flow rate | 0.6 mL/min |
| Injection pressure | Approximately 1.3 MPa to 1.7 MPa |
| Injection amount | 30 μL (solid content concentration: 0.4% by weight) |
| Control sample | Polyethylene oxide (used for creation of calibration curve) |
| Detector | RI |
| Calibration curve | Linear |

(2) Solubility Test of Polyimide Resin in Organic Solvent

To 0.5 g of resin, 9.5 g of the organic solvent (solid content concentration: 5%) shown in Table 2 was added in a sample tube, and the mixture was stirred at room temperature by a magnetic stirrer. The case where the resin was completely dissolved is indicated by "○", the case where the resin partially remained undissolved is indicated by "Δ", and the case where the resin was not dissolved is indicated by "×". The result of the evaluation is shown in Table 2.

(3) Linear Thermal Expansion Coefficient of Optical Film

The linear thermal expansion coefficient in a temperature range from 100° C. to 200° C. was measured by using TMA120C manufactured by Seiko Instruments Inc. as follows. A sample (width: 3 mm, length: 10 mm) was once heated from 10° C. to 260° C. at a rate of 10° C./min under an applied load of 3 g after input of the thickness of the sample. Then, the sample was then cooled to 10° C. Then, the sample was heated again at a rate of 10° C./min. A thermal expansion coefficient at 100° C. in the second heating and a thermal expansion coefficient obtained at 200° C. in the second heating was measured and averaged to obtain a linear thermal expansion coefficient.

(4) Glass Transition Temperature of Optical Film

The elastic modulus was measured by using DMS-200 manufactured by Seiko Instruments Inc. under the condition that a measuring length (measuring jig interval) is 20 mm. An inflexion point of the elasticity (peak top of tan δ) was obtained as a glass transition temperature.

(5) Total Light Transmittance of Optical Film

The total light transmittance was measured by using the integrating sphere-type hazemeter 300A manufactured by NIPPON DENSHOKU INDUSTRIES CO., LTD. in accordance with the method described in JIS K7105-1981.

(6) Haze of Optical Film

The haze of the optical film was measured by using the integrating sphere-type hazemeter 300A manufactured by NIPPON DENSHOKU INDUSTRIES CO., LTD. in accordance with the method described in JIS K7105-1981.

(7) Transmittance of Optical Film at Wavelength of 400 nm

The optical transmittance of a polyimide film at a wavelength ranging from 200 nm to 800 nm was measured by using the ultraviolet-visible-near infrared spectrophotometer (V-650) manufactured by JASCO Corporation. The transmittance at a wavelength of 400 nm was used as an index.

(8) Melting Point of Amide-Group-Containing Tetracarboxylic Acid

A melting point of an amide-group-containing tetracarboxylic acid was measured by using the differential scanning

TABLE 2

| | Tetra-carboxylic dianhydride | Diamine | Solubility | | | | |
|---|---|---|---|---|---|---|---|
| | | | DMF | MIBK | Ethyl acetate | Dioxolan | Cyclopentanone |
| Example 1 | TATFMB | TFMB | ○ | × | Δ | ○ | ○ |
| Comparative Example 1 | 6FDA | TFMB | ○ | ○ | ○ | ○ | ○ |
| Comparative Example 2 | ESDA | TFMB | ○ | × | ○ | ○ | ○ |

| | Molecular weight Mw | Linear thermal expansion coefficient CTE (ppm/k) | Glass transition temperature Tg (° C.) | Total light transmittance TT (%) | Transmittance at 400 nm T (%) | Haze (%) |
|---|---|---|---|---|---|---|
| Example 1 | 108000 | 9 | 355 | 89.3 | 23.6 | 0.8 |
| Comparative Example 1 | 120000 | 56 | 375 | 92.3 | 78.9 | 0.1 |
| Comparative Example 2 | 11000 | 47 | 307 | 90.1 | 64.3 | 0.1 |

Example 1

Synthesis of Amide-Group-Containing Tetracarboxylic Dianhydride (the Following Formula (5))

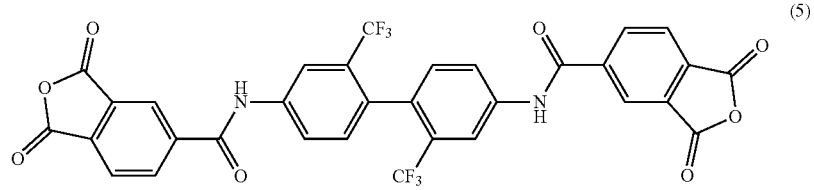

(5)

67.4 g of trimellitic anhydride chloride was introduced into a 500 mL glass separable flask equipped with a sealing stopper which is made of polytetrafluoroethylene and which is provided with a nitrogen inlet tube and a stirrer having a stainless stirring rod provided with four stirring blades. To the trimellitic anhydride chloride, a solvent mixture of 190 g of ethyl acetate and 190 g of n-hexane was added so as to dissolve the trimellitic anhydride chloride. Thereby, a solution A was prepared. Furthermore, 25.6 g of 2,2'-bis(trifluoromethyl)benzidine (hereinafter referred to as TFMB) was introduced into another vessel. To the TFMB, a solvent mixture of 72 g of ethyl acetate and 72 g of n-hexane was added so as to dissolve the TFMB. To the solution thus obtained, 9.2 g of propylene oxide was added as an acid trap agent. In this way, a solution B was prepared.

The solution B was dropped into the solution A kept at a temperature of approximately −20° C. under stirring in an ethanol ice bath. The mixture of the solution A and the solution B was stirred for another three hours at the temperature of approximately −20° C. Then, the mixture of the solution A and the solution B was stirred for twelve hours at room temperature. A precipitate was collected by filtration, and was then washed thoroughly with a solvent mixture of ethyl acetate and n-hexane (volume ratio: 1:1). Subsequently, the precipitate was collected by filtration, and dried in vacuum for twelve hours at 60° C. and further dried in vacuum for twelve hours at 120° C. Thus, a white product was obtained with a 70% yield. By using FT-IR and $^1$H-NMR, it was confirmed that the amide-group-containing tetracarboxylic dianhydride represented by the formula (5), which was the target product, was obtained. Specifically, by FT-IR, peaks of 3380 cm$^{-1}$ (amide group NH stretching vibration), 3105 cm$^{-1}$ (aromatic C—H stretching vibration), 1857 cm$^{-1}$, 1781 cm$^{-1}$ (acid anhydride group C=O stretching vibration), and 1677 cm$^{-1}$ (amide group C=O stretching vibration) were confirmed. Further, by $^1$H-NMR, peaks of δ 11.06 ppm (s, NH, 2H), δ 8.65 ppm (s, phthalimide unit, 3-position CaromH, 2H), δ 8.37 ppm (phthalimide unit, 5-position and 6-position CaromH, 4H), δ 7.46 ppm (d, biphenyl unit in the middle, 6-position and 6'-position CaromH, 2H), δ 8.13 ppm (d, biphenyl unit in the middle, 5-position and 5'-position CaromH, 2H), and δ 8.27 ppm (s, biphenyl unit in the middle, 3-position and 3'-position CaromH, 2H). Measurement by DSC revealed that the melting point of this compound was 274° C.

Synthesis of Polyimide 17.6 g of TFMB was introduced into a 500 mL glass separable flask equipped with a sealing stopper which is made of polytetrafluoroethylene and which is provided with a nitrogen inlet tube and a stirrer having a stainless stirring rod provided with four stirring blades. To the TFMB, 35 g of N,N-dimethylformamide (hereinafter referred to as DMF) that had been dehydrated was added as a solvent for polymerization, and the mixture was stirred. Then, to this solution, 10.1 g of the amide-group-containing tetracarboxylic dianhydride represented by the formula (5) was added, and the mixture was stirred at room temperature. Thus, a polyamic acid was obtained. Note that this reaction solution contained 30% diamine compound and tetracarboxylic dianhydride by weight with respect to the whole reaction solution.

After one-hour stirring, 43 g of DMF was added so as to dilute the solution. Then, the solution was further stirred for four hours. Subsequently, 24 g of DMF was added, and the solution was stirred until it is mixed uniformly. Then, 2.9 g of pyridine was added as an imidizing agent (a molar ratio of the imidizing agent to an amide group in the polyamic acid was 1.0) and fully dispersed. To the solution in which the pyridine was dispersed, 3.7 g of acetic anhydride was added as a dehydrating agent (molar ratio of the dehydrating agent to an amide group in the polyamic acid was 1.2). The solution thus obtained was stirred for four hours at 100° C., and was then cooled to room temperature. To the reaction solution thus cooled, 34 g of DMF was added. After stirring, the solution was transferred to a dripping funnel and allowed to drip, at a rate of 2 to 3 drops per second, into a 2 L separable flask charged with 200 g of isopropyl alcohol (hereinafter referred to as IPA). Thus, a target product was precipitated. Then, the precipitate was collected by suction filtration by using a Hirsch funnel, and washed with 300 g of IPA twice. Then, the precipitate was collected by suction filtration by using a Hirsch funnel, and dried in a vacuum oven at 100° C. overnight. Thus, a product was obtained with a 12.4 g yield. The result of evaluation of the polyimide resin thus obtained is shown in Table 2.

Production of Optical Film

The polyimide resin thus obtained was dissolved in cyclopentanone so as to produce a polyimide resin solution which contained 7% polyimide resin by weight. The polyimide resin solution thus obtained was applied onto a glass plate so as to form a polyimide resin solution film having a uniform thickness. Then, the polyimide resin solution film was dried for 10 minutes at 60° C. and further dried for 60 minutes at 150° C. Subsequently, the film was peeled from the glass plate. Thus, an optical film having a thickness of 20 μm was obtained. The result of evaluation of the optical film thus obtained is shown in Table 2.

Comparative Example 1

12.6 g of TFMB was introduced into 500 mL glass separable flask equipped with a sealing stopper which is made of polytetrafluoroethylene and which is provided with a nitrogen inlet tube and a stirrer having a stainless stirring rod provided with four stirring blades. To the TFMB, 58.3 g of DMF that had been dehydrated was added as a solvent for polymerization, and the solution was stirred. Then, to the solution, 17.4 g of 2,2-bis(3,4-dicarboxyphenyl)-1,1,1,3,3,3-hexafluoropropane dianhydride (hereinafter referred to as 6FDA) was added, and the solution was stirred for three hours. Thus, a polyamic acid was obtained. Note that this reaction solution contained 30% diamine compound and tetracarboxylic dianhydride by weight with respect to the whole reaction solution.

After 25 g of DMF was added to the solution, 7.3 g of pyridine was further added as an imidizing agent (molar ratio of the imidizing agent to an amide group in the polyamic acid was 1.0) and fully diffused. To the solution in which the pyridine was diffused, 9.6 g of acetic anhydride was added as a dehydrating agent (molar ratio of the dehydrating agent to an amide group in the polyamic acid was 1.2). The solution thus obtained was stirred for four hours at 100° C., and was then cooled to room temperature. To the reaction solution thus cooled, 18 g of DMF was added. After stirring, the solution was transferred to a dripping funnel and allowed to drip, at a rate of 2 to 3 drops per second, into a 2 L separable flask charged with 300 g of IPA. Thus, a target product was precipitated. Then, the precipitate was collected by suction filtration by using a Hirsch funnel, and washed with 300 g of IPA twice. Then, the precipitate was collected by suction filtration by using a Hirsch funnel, and dried in a vacuum oven at 100° C. overnight. In this way, a product was obtained with a 22.5 g yield.

The polyimide resin thus obtained was dissolved in methyl isobutyl ketone (hereinafter referred to as MIBK) so as to produce a polyimide resin solution which contained 15% polyimide resin by weight. The polyimide resin solution thus obtained was applied onto a glass plate so as to form a polyimide resin solution film having a uniform thickness. Then, the polyimide resin solution film was dried for 10 minutes at 60° C. and further dried for 60 minutes at 150° C. Subsequently, the film was peeled from the glass plate. Thus, an optical film having a thickness of 20 μm was obtained. The result of evaluation of the resin and the optical film thus obtained is shown in Table 2.

Comparative Example 2

10.7 g of TFMB was introduced into 500 mL glass separable flask equipped with a sealing stopper which is made of polytetrafluoroethylene and which is provided with a nitrogen inlet tube and a stirrer having a stainless stirring rod provided with four stirring blades. To the TFMB, 58 g of DMF that had been dedyrated was added as a solvent for polymerization, and the solution was stirred. To this solution, 19.3 g of 2,2-bis(4-hydroxyphenyl)propane dibenzoate-3,3',4,4'-tetracarboxylic dianhydride (hereinafter referred to as ESDA) was added, and the solution was stirred for three hours. Thus, a polyamic acid was obtained. Note that this reaction solution contained 30% diamine compound and tetracarboxylic dianhydride by weight with respect to the whole reaction solution.

After 36 g of DMF was added to the solution, 6.2 g of pyridine was further added as an imidizing agent (molar ratio of the imidizing agent to an amide group in the polyamic acid was 1.0) and fully diffused. To the solution in which the pyridine was diffused, 8.2 g of acetic anhydride was added as a dehydrating agent (molar ratio of the dehydrating agent to an amide group in the polyamic acid was 1.2). The solution thus obtained was stirred for four hours at 100° C., and was then cooled to room temperature. To the reaction solution thus cooled, 22 g of DMF was added. After stirring, the solution was transferred to a dripping funnel and allowed to drip, at a rate of 2 to 3 drops per second, into a 2 L separable flask charged with 300 g of IPA. Thus, a target product was precipitated. Then, the precipitate was collected by suction filtration by using a Hirsch funnel, and washed with 300 g of IPA twice. Then, the precipitate was collected by suction filtration by using a Hirsch funnel, and dried in a vacuum oven at 100° C. overnight. In this way, a product was obtained with a 24.0 g yield.

The polyimide resin thus obtained was dissolved in cyclopentanone so as to produce a polyimide resin solution which contained 15% polyimide resin by weight. The polyimide resin solution thus obtained was applied onto a glass plate so as to form a polyimide resin solution film having a uniform thickness. Then, the polyimide resin solution film was dried for 10 minutes at 60° C. and further dried for 60 minutes at 150° C. Subsequently, the film was peeled from the glass plate. Thus, an optical film having a thickness of 20 μm was obtained. The result of evaluation of the resin and the optical film thus obtained is shown in Table 2.

The optical film of the present invention is preferably arranged such that Af in the formula (1) is represented by the following formula (2):

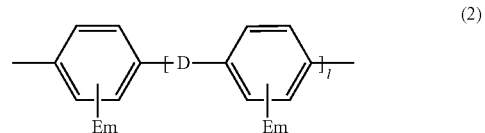

where D represents a functional group selected from a single bond, a $CR_2$ group, a CO group, a $SO_2$ group, a $SiR_2$ group, an oxygen atom, and a sulfur atom, where R is identically or differently a hydrogen atom, a fluorine atom, an alkyl group having 1 to 20 carbon atoms, or an aryl group having 6 to 20 carbon atoms, the two Rs may form a ring with each other, and a hydrogen atom in the alkyl group and the aryl group may be substituted with a fluorine atom, and E represents a fluorine atom or an organic group which has a fluorine atom, m is an integer of 0 to 4, and l is an integer of 0 to 4.

The optical film of the present invention is preferably arranged such that Af in the formula (1) is selected from the following formulas (3) and (4):

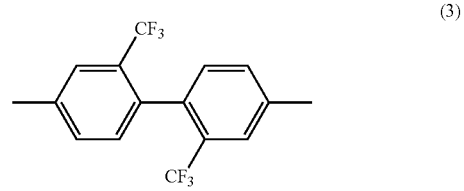

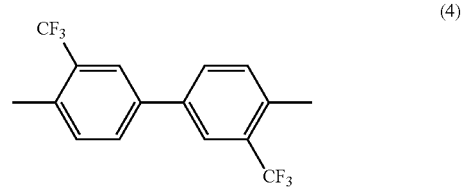

The optical film of the present invention is preferably arranged such that B in the formula (1) has an aromatic ring and a fluorine atom.

The optical film of the present invention is preferably arranged such that B in the formula (1) is represented by the following formula (2):

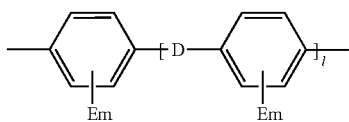

(2)

where D represents a functional group selected from a single bond, a $CR_2$ group, a CO group, a $SO_2$ group, a $SiR_2$ group, an oxygen atom, and a sulfur atom, where R is identically or differently a hydrogen atom, a fluorine atom, an alkyl group having 1 to 20 carbon atoms, or an aryl group having 6 to 20 carbon atoms, the two Rs may form a ring with each other, and a hydrogen atom in the alkyl group and the aryl group may be substituted with a fluorine atom, and E represents a fluorine atom or an organic group which has a fluorine atom, m is an integer of 0 to 4, and 1 is an integer of 0 to 4.

The optical film of the present invention is preferably arranged such that B in the formula (1) is selected from the following formulas (3) and (4):

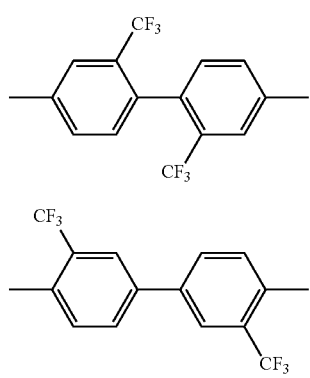

(3)

(4)

The optical film of the present invention is preferably arranged such that the polyimide is obtainable by mixing a dehydrating agent and an imidizing agent with a polyamic acid so as to imidize the polyamic acid.

The optical film of the present invention is preferably arranged such that the polyimide is soluble in an organic solvent.

The optical film of the present invention is preferably arranged such that the organic solvent is at least one selected from amide type solvents, ketone type solvents, and ether type solvents.

The optical film of the present invention preferably has total light transmittance of 85% or more.

The optical film of the present invention preferably has transmittance of 10% or more at a wavelength of 400 nm.

The optical film of the present invention preferably has glass transition temperature of 250° C. or more.

A method of the present invention for producing an optical film preferably includes the steps of: (a) imidizing polyamic acid varnish, which is a mixture of a dehydrating agent, an imidizing agent, and a polyamic acid; (b) mixing a poor solvent after the step (a) so as to obtain a solid product; (c) dissolving the solid product in an organic solvent so as to obtain a solution; and (d) applying the solution to a substrate after the step (c) so as to form a film.

A transparent substrate of the present invention consists of the optical film of the present invention.

An image display device of the present invention includes the optical film of the present invention.

A solar cell of the present invention includes the optical film of the present invention.

An optical film of the present invention may be arranged to include a polyimide having a repeating unit represented by the following formula (1):

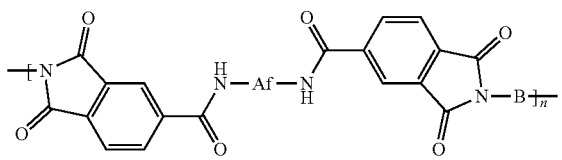

(1)

where Af represents a bivalent organic group having an aromatic ring and a fluorine atom, and B represents a bivalent organic group.

INDUSTRIAL APPLICABILITY

The optical film of the present invention has not only the original properties of a polyimide such as heat resistance and insulating property, but also high dimensional stability and high solubility in organic solvents. Accordingly, the optical film of the present invention is used in fields/products for which these properties are effective, such as printed materials, color filters, flexible displays, image display devices such as liquid crystal display devices, organic EL display devices, and electronic paper, or solar cells.

The invention claimed is:

1. An optical film comprising a polyimide having a repeating unit n represented by the following formula (1):

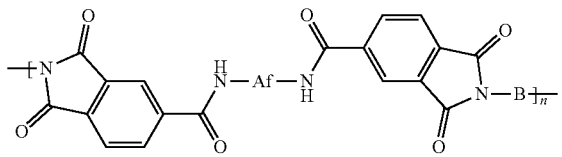

(1)

where Af represents a bivalent organic group having an aromatic ring and a fluorine atom and B represents a bivalent organic group, the optical film having a linear thermal expansion coefficient of 20 ppm/K or less.

2. The optical film according to claim 1, wherein:

Af in the formula (1) is represented by the following formula (2):

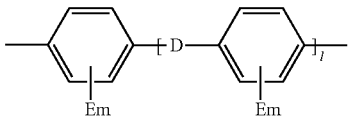

(2)

where D represents a functional group selected from a single bond, a $CR_2$ group, a CO group, a $SO_2$ group, a $SiR_2$ group, an oxygen atom, and a sulfur atom, where R is identically or differently a hydrogen atom, a fluorine atom, an alkyl group having 1 to 20 carbon atoms, or an aryl group having 6 to 20 carbon atoms, the two Rs may form a ring with each other, and a hydrogen atom in the alkyl group and the aryl group may be substituted with a fluorine atom, and E represents a fluorine atom or an organic group which has a fluorine atom, m is an integer of 0 to 4, and 1 is an integer of 0 to 4.

3. The optical film according to claim 1, wherein:
Af in the formula (1) is selected from the following formulas (3) and (4):

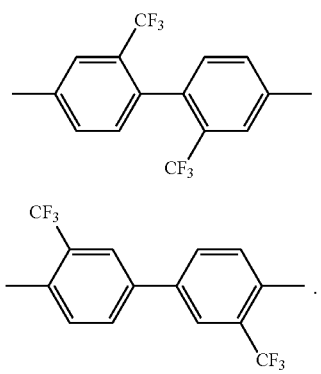

(3)

(4)

4. The optical film according to claim 1, wherein B in the formula (1) has an aromatic ring and a fluorine atom.

5. The optical film according to claim 1, wherein:
B in the formula (1) is represented by the following formula (2):

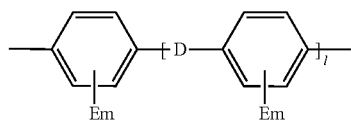

(2)

where D represents a functional group selected from a single bond, a $CR_2$ group, a CO group, a $SO_2$ group, a $SiR_2$ group, an oxygen atom, and a sulfur atom, where R is identically or differently a hydrogen atom, a fluorine atom, an alkyl group having 1 to 20 carbon atoms, or an aryl group having 6 to 20 carbon atoms, the two Rs may form a ring with each other, and a hydrogen atom in the alkyl group and the aryl group may be substituted with a fluorine atom, and E represents a fluorine atom or an organic group which has a fluorine atom, m is an integer of 0 to 4, and 1 is an integer of 0 to 4.

6. The optical film according to claim 1, wherein B in the formula (1) is selected from the following formulas (3) and (4):

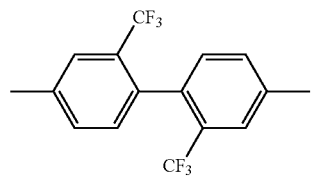

(3)

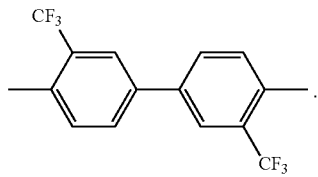

(4)

7. The optical film according to claim 1, wherein the polyimide is obtainable by mixing a dehydrating agent and an imidizing agent with a polyamic acid so as to imidize the polyamic acid.

8. The optical film according to claim 1, wherein the polyimide is soluble in an organic solvent.

9. The optical film according to claim 8, wherein the organic solvent is at least one selected from amide type solvents, ketone type solvents, and ether type solvents.

10. The optical film according to claim 1, wherein the optical film has total light transmittance of 85% or more.

11. The optical film according to claim 1, wherein the optical film has transmittance of 10% or more at a wavelength of 400 nm.

12. The optical film according to claim 1, wherein the optical film has glass transition temperature of 250° C. or more.

13. A method for producing an optical film as set forth in claim 1, comprising the steps of:
  (a) imidizing polyamic acid varnish, which is a mixture of a dehydrating agent, an imidizing agent, and a polyamic acid;
  (b) mixing a poor solvent after the step (a) so as to obtain a solid product;
  (c) dissolving the solid product in an organic solvent so as to obtain a solution; and
  (d) applying the solution to a substrate after the step (c) so as to form a film.

14. A transparent substrate consisting of an optical film as set forth in claim 1.

15. An image display device comprising an optical film as set forth in claim 1.

16. A solar cell comprising an optical film as set forth in claim 1.

* * * * *